(No Model.) 8 Sheets—Sheet 6.
J. F. McAFEE & J. H. LOBACK.
AUTOMATIC WINDING ATTACHMENT FOR CARDING MACHINES.
No. 439,542. Patented Oct. 28, 1890.
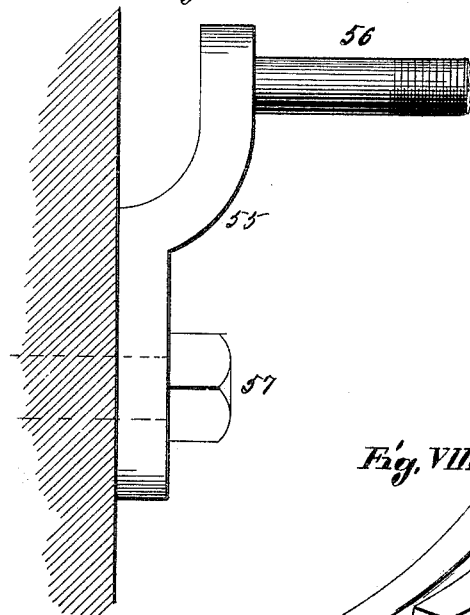
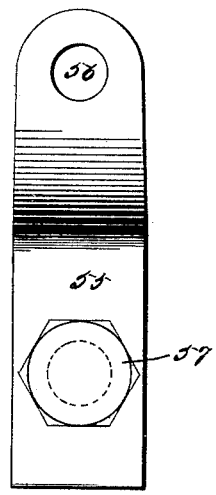
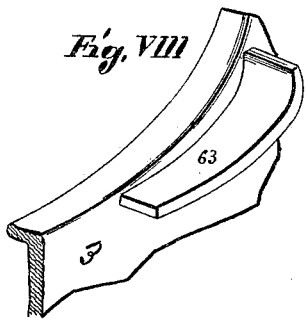
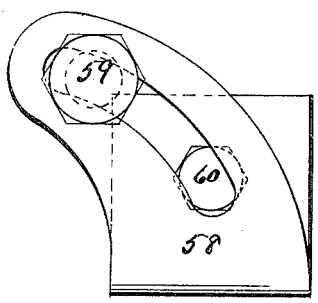
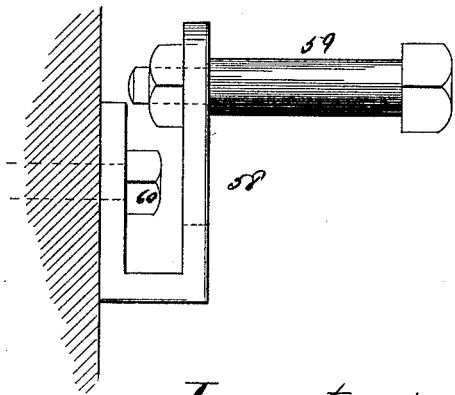
Attest:
Wm. E. Knight
E. Arthur
Inventors
John F. McAfee
John H. Loback
By Knight Bro
Atty's (No Model.) 8 Sheets—Sheet 7.
J. F. McAFEE & J. H. LOBACK.
AUTOMATIC WINDING ATTACHMENT FOR CARDING MACHINES.
No. 439,542. Patented Oct. 28, 1890.
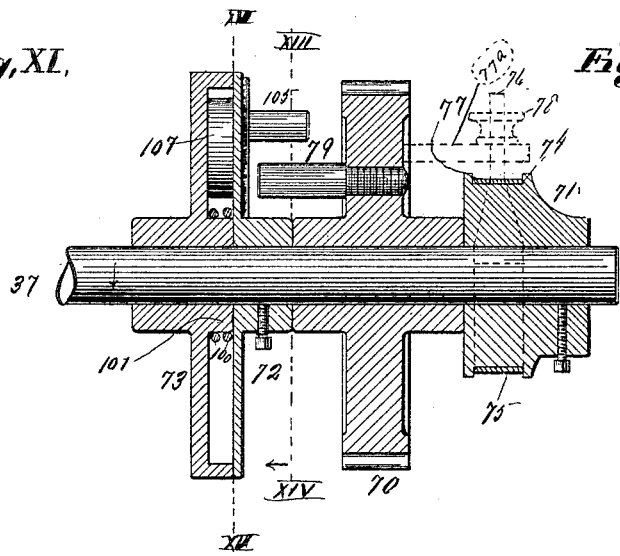
Fig. XI.
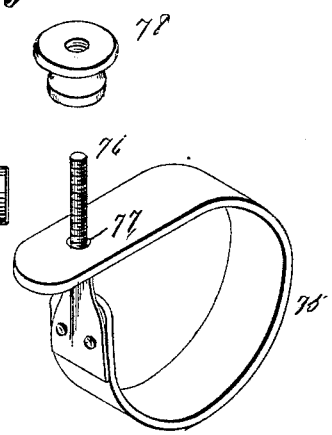
Fig. XII.
Attest:
Wm E. Knight
E. Arthur
Inventor:
John F. McAfee
John H. Loback;
By Knight Bros
Attys;

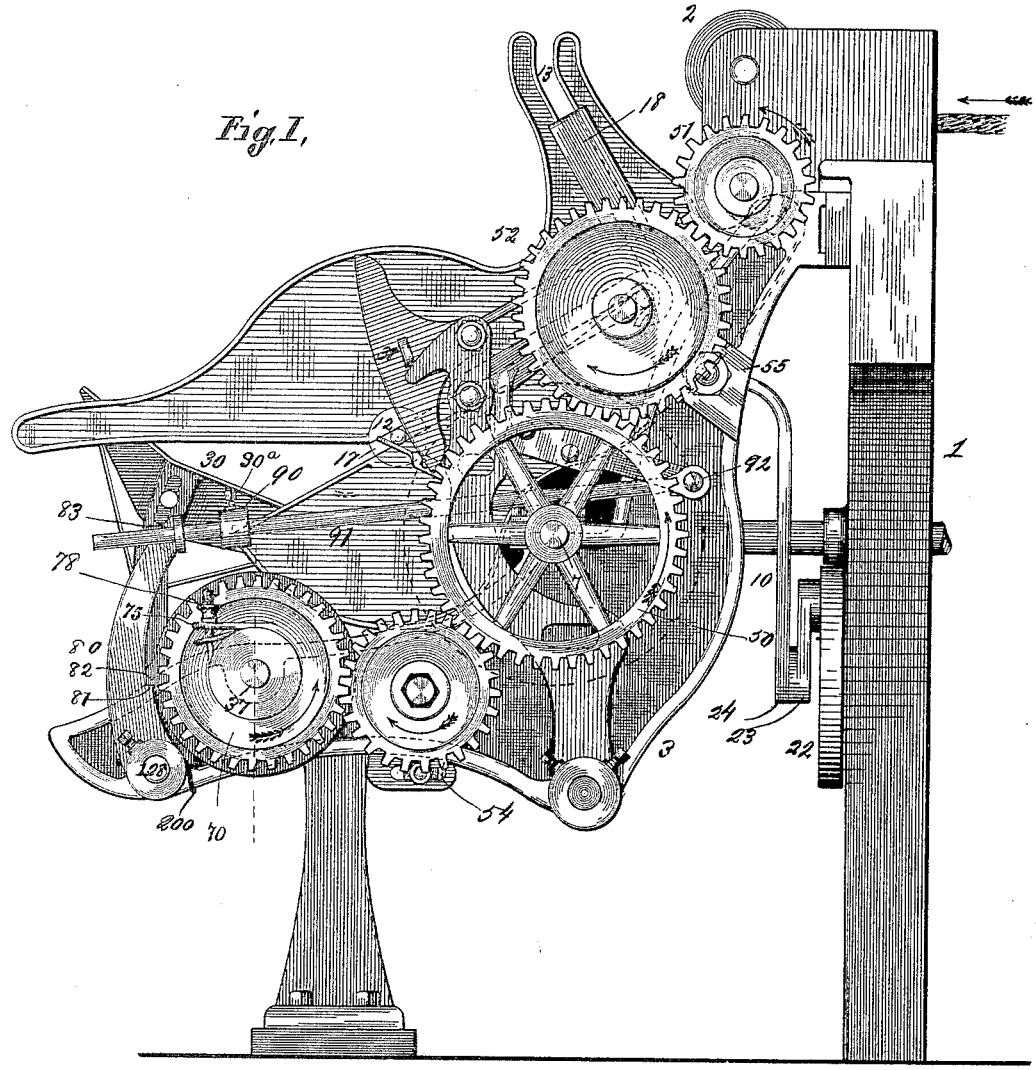

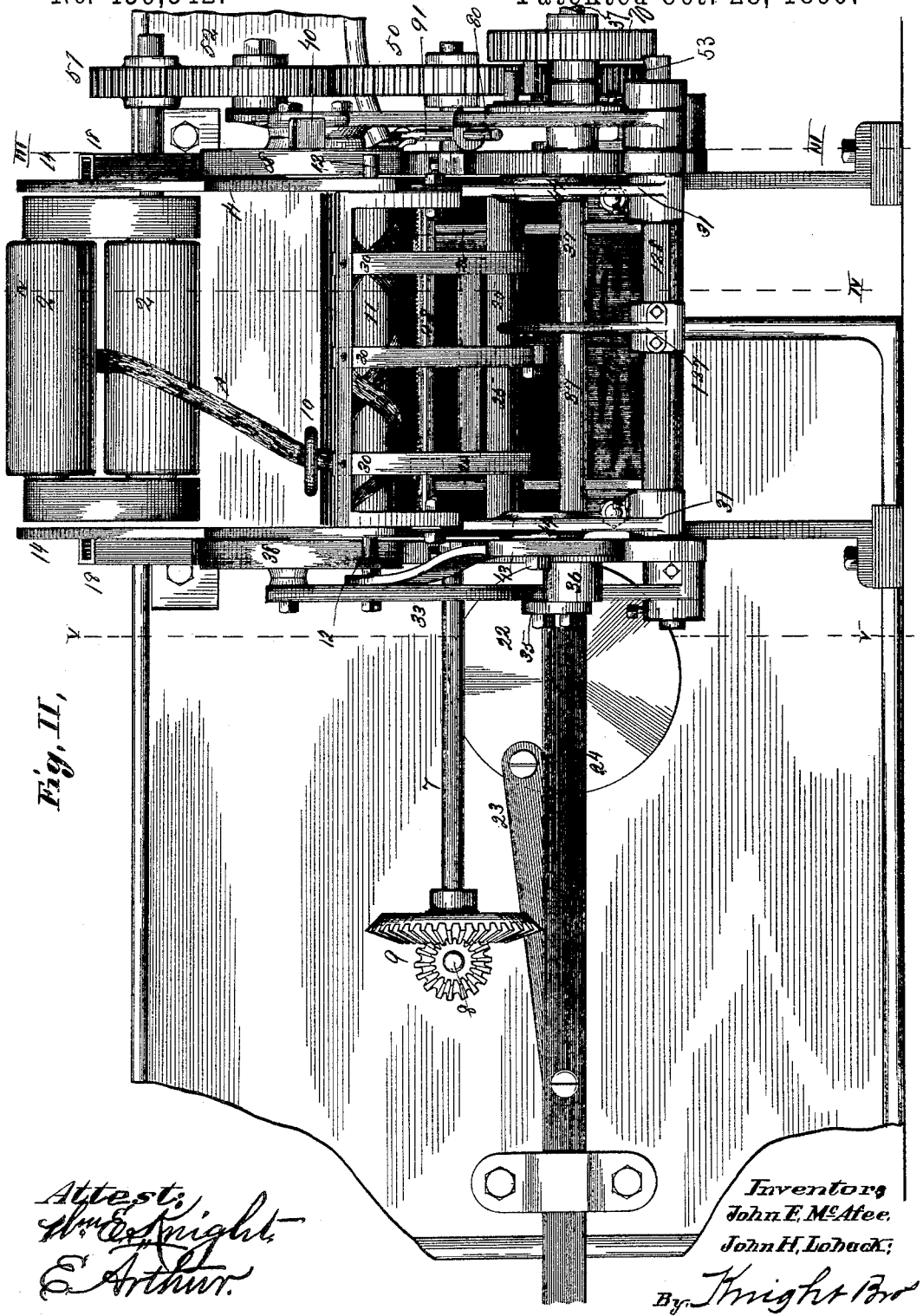

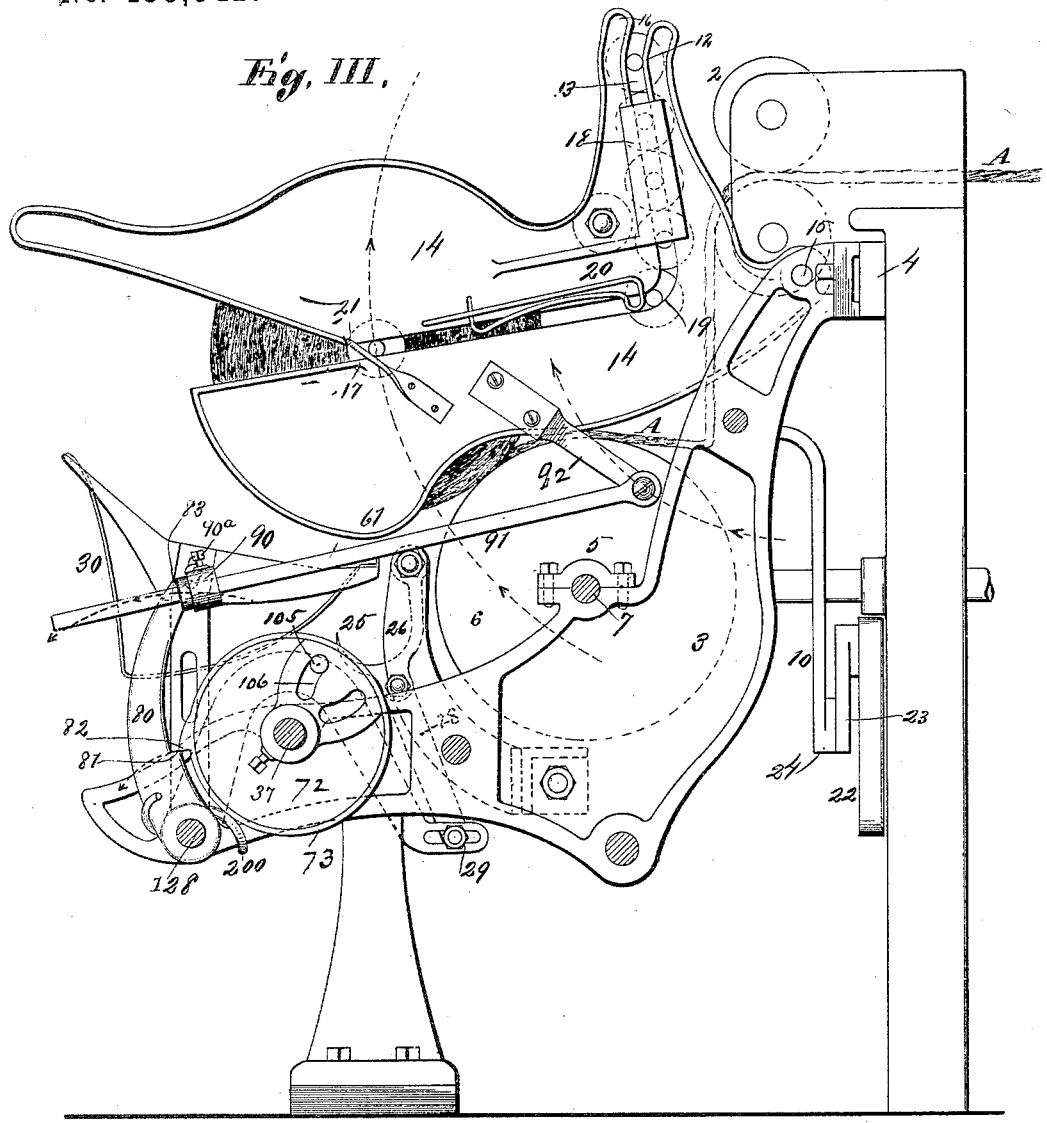

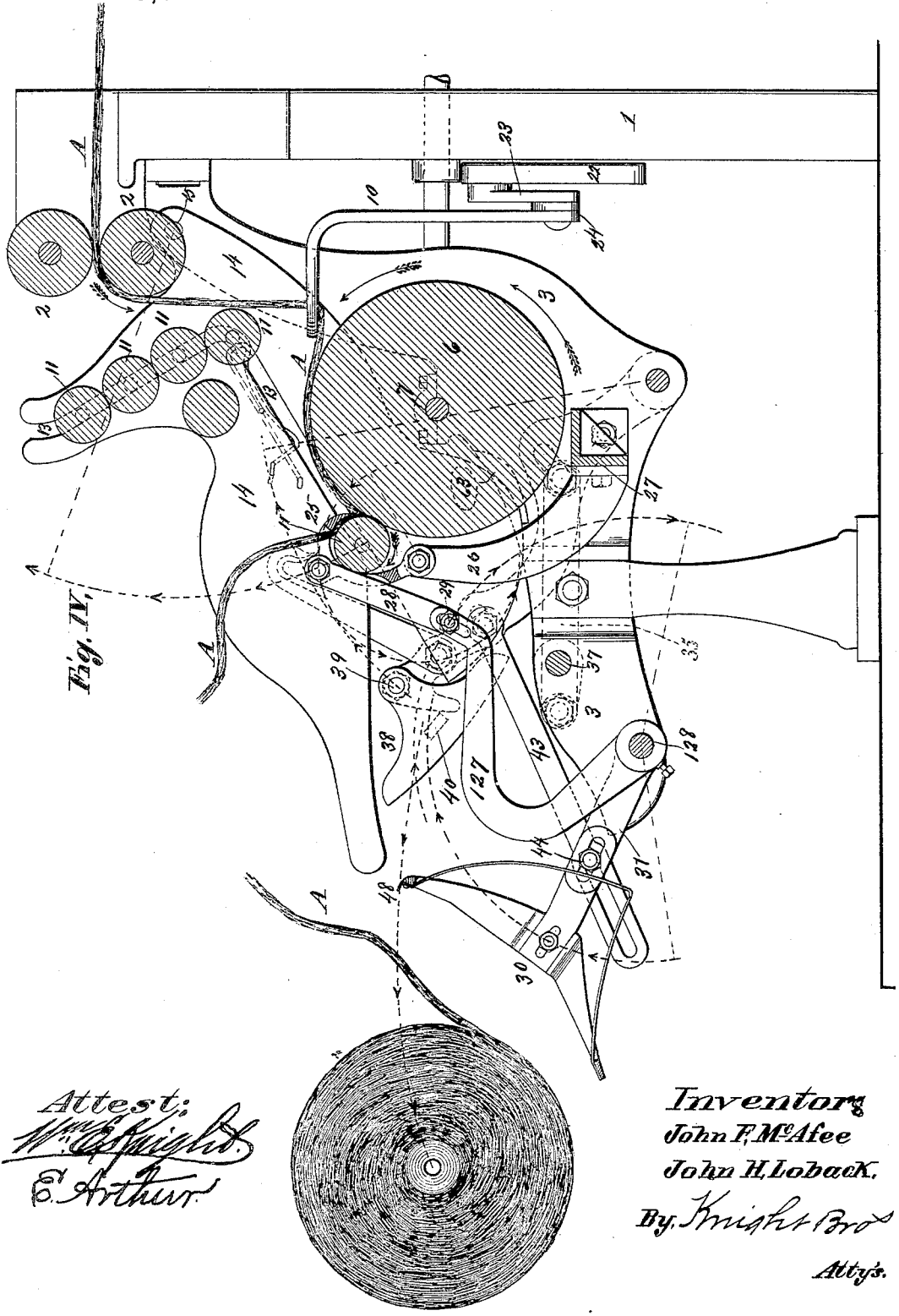

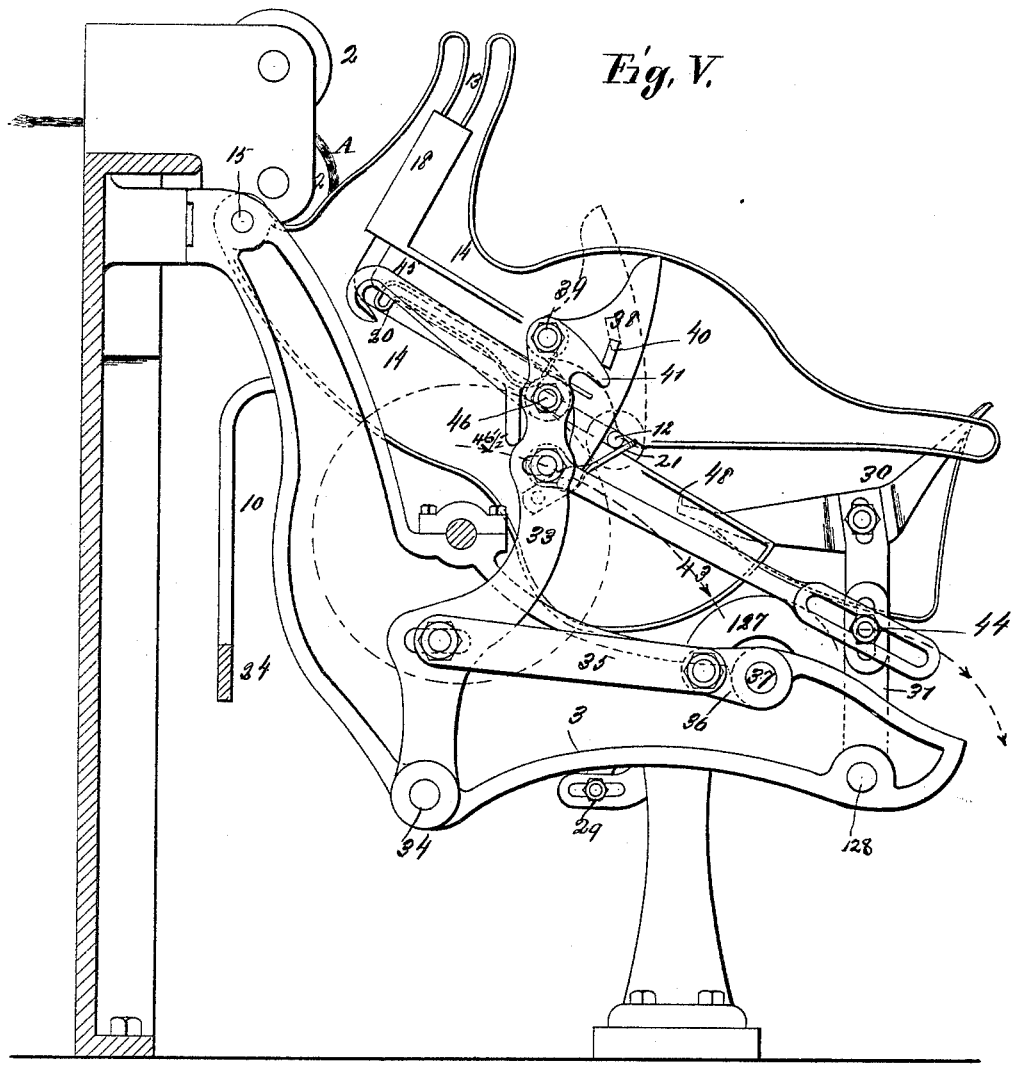

(No Model.) 8 Sheets—Sheet 8.
J. F. McAFEE & J. H. LOBACK.
AUTOMATIC WINDING ATTACHMENT FOR CARDING MACHINES.
No. 439,542. Patented Oct. 28, 1890.
FIG. XIII.
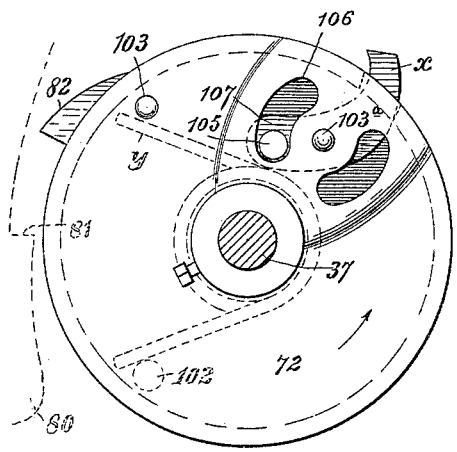
FIG. XIV.
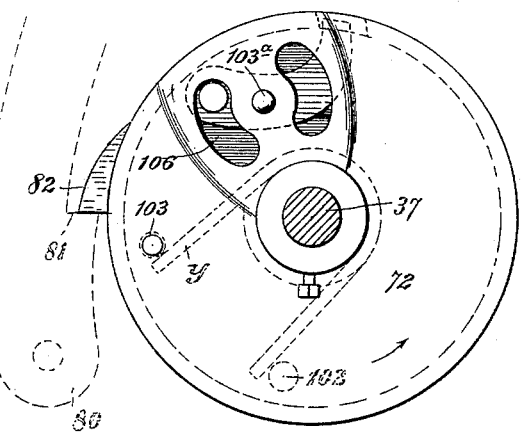
FIG. XV.
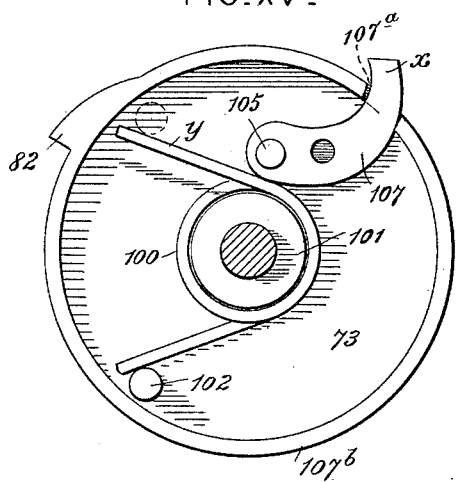
Attest:
Geo. T. Smallwood.
F. A. Hopkins.
Inventors
John F. McAfee.
John H. Loback.
by Knight Bros. Attys

UNITED STATES PATENT OFFICE.

JOHN FRANKLIN McAFEE AND JOHN HENRY LOBACK, OF PLEASANT HILL, MISSOURI.

AUTOMATIC WINDING ATTACHMENT FOR CARDING-MACHINES.

SPECIFICATION forming part of Letters Patent No. 439,542, dated October 28, 1890.

Application filed June 16, 1888. Serial No. 277,287. (No model.)

*To all whom it may concern:*

Be it known that we, JOHN FRANKLIN MC-AFEE and JOHN HENRY LOBACK, both of Pleasant Hill, in the county of Cass and State of Missouri, have invented a certain new and useful Improvement in Automatic Winding Attachments for Carding-Machines, of which the following is a full, clear, and exact description, reference being had to the accompanying drawings, forming part of this specification, and in which—

Figure I is a side elevation of our improved attachment. Fig. II is a front elevation. Fig. III is a side elevation and vertical transverse section taken on line III III, Fig. II. Fig. IV is a section taken on line IV IV, Fig. II. Fig. V is a view similar to Fig. III, taken on line V V, Fig. II. Figs. VI to X, inclusive, show details of parts hereinafter more particularly mentioned. Figs. XI to XV, inclusive, represent the clutch mechanism by which the shaft operating the basket and other parts is given an intermittent movement, Figs. XIII and XIV showing the shaft 37 in section on line XIII XIV, Fig. XI, and Fig. XV showing the interior of the disk 73 and the shaft 37 in section on line XV XV, Fig. XI, these parts being particularly described farther on.

Our invention relates to an attachment for carding-machines, whereby the bobbins or spools are automatically placed and removed and the web automatically severed from a full bobbin and automatically connected to a fresh or empty bobbin.

Our invention consists in features of novelty hereinafter fully described, and pointed out in the claims.

Referring to the drawings, 1 represents part of the frame, and 2 the delivery-rolls, of a carding-machine.

3 represents the main frame of our attachment, which is secured at 4 to the frame 1 of the machine. Mounted on this frame 3 in journal-boxes 5 is a roller 6, which is secured to a shaft 7, turned or revolved continuously by a shaft 8 upon the machine, with which it has bevel-wheel connection 9. (See Fig. II.) The web A, passing from the delivery-rolls 2, extends downwardly through a loop in an arm 10, and thence over the roller 6, as shown in Fig. IV.

11 represents the bobbins or spools (see Fig. IV) having arbors or extensions 12, (see Fig. II,) which fit in slots or tracks 13 in side pieces or cheeks 14, (see Fig. IV,) that are pivoted at 15 to the frame 3. (See Figs. III, IV, and V.) The slots 13 divide the respective side pieces into two parts from a point 16 to a point 17, (see Fig. III,) and these two parts of each side piece are connected by U-shaped brackets 18, which are preferably cast integral with them, (see Figs. II, III, and V,) these brackets holding the two parts of each side piece together, but not interfering with the passage of the bobbin-arbors, which extend beyond the side pieces into the U of the brackets. The slots 13 extend from 16 in a substantially vertical direction to a point 19, (see Fig. III,) from which they extend to the point 17 in a nearly horizontal slightly-inclined direction. The slots above the point 19 are filled with spools or bobbins, as shown in Figs. III and IV, and the lowest one is retained at the point 19 by means of spring-arms 20 until it is wanted, and as soon as it is removed the bobbins above it fall down, the lowest one of those left taking its place. As a bobbin is removed from behind the spring-arms 20, it travels along the nearly-horizontal parts of the slots to the point 17, where it is held or arrested in its movement by means of springs 21, (see Fig. III,) and it bears at this time upon the roller 6. (See Fig. IV.) The roller 6 turns in the direction indicated by the arrows in Fig. IV, and by means of frictional contact. The bobbin of course turns in the opposite direction, as indicated by the arrow.

Upon the bobbin the web A is wound from end to end, and to cause the web to be wound from end to end the arm 10 is given a horizontal oscillatory movement by means of a disk 22, (see Fig. II,) which is driven from the main machine, and which is connected by a link 23 to a horizontal extension 24 of the vertical arm 10. It will thus be seen that as the disk 22 revolves the arm will be oscillated from end to end of the roller 6 and from end to end of the bobbin. When a fresh bobbin, as seen in Fig. IV, is brought into place, as described, the web is pressed down between the rollers 6 and bobbin by means of a tucker-arm 25. (See Fig. IV.) The arm is pivoted to a bracket 26, secured at 27 to the frame 3, and it is operated by means of an arm 127, secured to a rock-shaft 128, journaled in the frame 3. The inner end of the arm 127 is connected to the tucker by means of a link 28, the link having a slot-and-pin connection 29 with the arm. Thus at the proper time the tucker is moved from the position shown in Fig. III to the position shown in Fig. IV to press the web between the bobbin and the roller 6, and then moves back again into the position shown in Fig. III, and this movement of the tucker causes the web to be carried in between the roller and bobbin, and adhering to the bobbin it is wound thereon. As the bobbin fills, the side pieces or cheeks 14 rise (turning on their pivots 15) from the position shown in Fig. IV to the position shown in Fig. III, and when the bobbin is full it is ejected or discharged into a basket 30. The outer position of the basket is shown in Fig. IV, and it moves to the position shown in Fig. III to receive the full bobbins, this movement being effected by means hereinafter described. As the basket moves into the position to receive the bobbin, the bobbin is forced from behind the springs 21 (and allowed to roll into the basket) by means of arms 33, (see Fig. V,) there being one on each side of the machine, pivoted at 34 to the frame 3, and connected by means of links 35 to cranks 36 on a shaft 37. The upper end of each arm 33 is provided with a head 38, pivoted to it at 39, and the lower end of which fits behind the arbor 12 of the bobbin, and which has a lug 40 resting on a projection 41 of the arm 33. It will be seen that as the arms 33 are moved by the cranks 36 in the direction indicated by the arrow in Fig. V the bobbin will be moved from behind the springs 21, and will roll into the basket. The arms 31 of the basket are connected to the arms 33 by means of links 43, with which they have slot-and-pin connection 44, as shown in Figs. IV and V, the slot-and-pin connection being made to provide a lost movement, so that the bobbin will be forced into the basket before the inner ends of the slots come against the pins to move the basket back to its lower position, or from the position shown in Fig. III to the position shown in Fig. IV. When the basket has made this movement and the full bobbin is removed or discharged, the basket is carried back again (at the proper time) to the position shown in Fig. III by means of the arms 33, the rock-shaft 128 turning in its bearings, and the heads 38 are brought back behind the arbors 12 of the next bobbin, (which has by this time rolled into place,) the heads 38 passing the arbors of the bobbins by turning on their pivots 39, as their lower ends come against the arbors. (See dotted lines, Fig. V.) As soon as the lower ends of the heads pass the bobbins in the backward movement of the arms 33 they drop into normal position again, with the lugs 40 resting on the projections 41. As the arms 33 move forward to discharge the full bobbin, they draw an empty bobbin from behind the spring-arms 20 by means of hooks 45, pivoted thereto at 46 and having lugs 46½ to bear against the arms and hold them (the hooks) in a nearly horizontal position. (See Fig. V.) The spring-arms being made light, yield upwardly under the pressure of the moving hooks and release the bobbin, but fall immediately into place again, preventing the passage of another bobbin. As the arms 33 move back to bring the heads 38 behind the arbors of the bobbin resting against the springs 21, the hooks 45 are carried back over the arbors of the bobbin resting against the ends of the spring-arms 20, and thus the operation goes on. Each time the arms 33 move in the direction indicated by the arrow in Fig. V they force a full bobbin from behind the spring 21 and simultaneously draw an empty bobbin from behind the springs 20; then they move the basket, (which has not commenced to move yet, owing to the lost-motion connection 44 between the link 43 and the arms of the basket,) which has received the full bobbin, and then returning, they move the heads 38 behind the arbors of the bobbin resting against the springs 21, and move the hooks behind the arbors of the bobbin resting against the ends of the spring-arms 20, and also move the basket back into the position to receive the next bobbin. This movement is obtained from the shaft 37, which is turned intermittently. As the basket commences to move downwardly, a serrated edge 48 thereon (see Figs. II, IV, and V) comes against the web and severs it, (the parts being so disposed that the tucker has by this time reached the position shown in Fig. IV to act against the severing-edge of the basket,) as shown in Fig. IV, thus disconnecting the bobbin automatically and allowing the end of the web to be wound upon the fresh bobbin. The feed-rollers 2 may be turned from a cog-wheel 50 on the shaft 7 of the roller 6, (see Fig. I,) to which it is connected by a pinion 51 and an idler 52. The shaft 37 is turned from the shaft 7 of the roller 6, to which it is connected by means of an idle gear-wheel 70, geared to the wheel 50 by an idler 54, which latter, however, does not mesh with the wheel 50, but has secured to its inner side another idler 53, which is identically like the wheel 54, and which engages with the wheel 50. The idler 52 is supported on a bracket 55, provided with a journal-pin 56, (see Figs. VI and VII,) the bracket being attached to the frame 3 by means of a bolt 57. The idler 54 and its mate 53, that engages the wheel 50, are supported by a bracket 58 having a journal-pin 59, (see Figs. IX and X,) the bracket being secured to the frame by means of a bolt 60. When a full bobbin is discharged from behind the springs 21, the cheeks 14 drop, turning on their pivots 15 from the position shown in Fig. III to the position shown in Fig. IV, and they are arrested in this movement by the rounded portions 61 of the lower parts of the cheeks falling into lugs 63, cast upon the frame 3. (See full lines, Fig. VIII, and dotted lines, Fig. IV.) The shaft 37 is given an intermittent movement by means of the two devices represented in Figs. XI to XV, inclusive. One of these devices is a friction-gear adapted to impart motion to the shaft 37 from the gearing connected with the main driving-shaft; and it consists of the hub 71, secured to said shaft and having a peripheral groove 74, in which fits a flexible friction-strap 75, provided at one end with a threaded rod or stem 76, which passes through a perforation 77 and an arm 77ᵃ, and a revolving gear-wheel 70, connected to said strap by arm 77ᵃ, whereby the strap is carried around the hub 71 continuously and revolves the hub and shaft 37 with it, the stem 76 passing through this arm 77ᵃ and being provided with a thumb-nut 78 above the arm, the pressure of the strap on the hub may be regulated. The friction of this strap 75 on the hub 71 has a normal tendency to revolve the shaft 37, and under ordinary circumstances said shaft will be thus revolved; but when the shaft encounters an abnormal resistance the strap will slip around on the hub without revolving it. The other of these devices is properly termed a "clutch," and the revolving gear 70, having a projecting pin or lug 79, constitutes its driving member, while the other member of this clutch consists of disks 72 73, the former rigidly and the latter loosely mounted on the shaft 37, and the former having a pivoted plate 107, carrying a pin 105, projecting from the said disk 72 through a slot 106 therein, and being adapted to be brought into line with pin 79, and thus cause the shaft to revolve with a positive motion, together with the wheel 70, by means of a spring 100 and mechanism which will now be explained.

The disk 73 is mounted loosely on the shaft 37 against the fixed disk 72, as stated, and it has a hub 101 and a peripheral rim 107ᵇ, which rest against the fixed disk so as to leave an open space between the two disks. Surrounding the hub 101 of the disk 73 is the spring 100, whose two arms engage, respectively, a pin 102 on the loose disk 73 and a pin 103 on the disk 72, secured to the shaft 37, and the office of this spring is simply to hold the clutch members normally in engagement, as hereinafter described. Pivoted at 103ᵃ to the fixed disk 72 is the plate 107, which is flat and hook shaped, whose outer end or tail $x$ engages in a notch 107ᵃ in the rim 107ᵇ of the disk 73, while the inner end of said plate carries the projecting lug or pin 105, which works in a slot 106, formed in the fixed disk 72. Thus it will be seen that inasmuch as the tail $x$ of the plate 107 engages the disk 73 and the pin 105 of said plate engages in the ends of the slot 106 of the disk 72 such disks are practically connected together and capable of revolution independently of each other only in so far as the plate 107 will permit by swinging on its pivot, and although the disk 73 has no direct connection with the shaft 37 it is nevertheless connected thereto indirectly and compelled to revolve therewith through the medium of the above-described connections. The pin 105 projects from the slot 106, as shown in Fig. XI, and is adapted at certain times to be thrown into the path of the pin 79, projecting from the gear-wheel 70, and when these pins contact with each other it is of course seen the disk 72, as also the disk 73, will become locked to this loose continuously-revolving wheel 70, and consequently a positive rotation will be imparted to the shaft 37. It might be here stated that during the winding of a bobbin the position of the parts is as shown in Fig. XIV. The spring 100, when compressed between the two pins 102 103, one on each disk, will cause disk 73 to have a tendency to revolve in the direction indicated by the arrow in Figs. XIII and XIV. This independent revolution of the disk 73, however, when permitted to occur will only be continued until the pin 105 at the inner end of the plate 107 is forced into the inner end of the slot 106 by the rear edge of the slot in the rim 107ᵇ pressing against the tail $x$ of the plate, and thus oscillating said plate on its pivot-pin, as shown in Fig. XIII. While this pressure produced on the end $x$ of the plate is continuously kept up by the spring 100, it will be understood that the pins 79 and 105 will be normally kept in contact, and they can be disengaged from each other only by turning the disk 73 relatively to the disk 72—that is, by holding the disk 73 stationary until the parts are in the relative position shown in Fig. XIV, and until the lug or pin 103 compresses the spring again, as in said Fig. XIV. To produce this relative movement and to effect this compression of the spring 100, the disk 73 is provided with a lug 82 on the periphery of its rim, which lug in being carried around with the said disk is adapted at the proper time, as will be presently described, to be engaged by a latch 80, having a shoulder 81, mounted on the rock-shaft 128. This latch 80 is operated to engage and release the lug 82 on the disk 73 at the proper time by a rod 91, having a collar 90, secured adjustably thereon by means of a set-screw 90ᵃ, (see Fig. I,) and which is pivoted to an arm 92 on one of the cheeks 14. This rod passes through the perforated upper end of the latch 80, as shown at 83. Now, supposing that a bobbin has just dropped between the cheeks 14 against the stops 21 and is being wound, the cheeks of course will be in their lower position, as shown in Fig. I, and the arm 92, Fig. III, having pulled the rod 91 to the right, the shoulder 81 will be forced into engagement with the lug 82 by virtue of the spring 200, (hereinafter described,) and the parts will be in the position shown at Fig. XIV, with the spring 100 compressed by reason of disk 73 being locked, while the disk 72 and shaft 37 have a tendency to revolve with the friction-strap 75. As the shaft and disk 72 continue to move forward, the tail $x$ of plate 107 is carried against the forward edge of slot 107ª, tilting plate 107 and carrying-pin 105 outward to the outer end of slot 106, thereby disengaging said pin 105 from pin 79. The disk 73, and consequently the shaft 37, now being locked by the lug 82 and shoulder 81, and the wheel 70, carrying the strap 75, revolving with its pin 79 out of contact with the pin 105, the bobbin will continue to fill, and as it does so the cheeks 14 will gradually rise, and, carrying the lower end of the arm 92 forward, will force the collar 90 against the latch 80, thus causing the latter to release the disk 73, whereupon the expansion of spring 100 will carry disk 73 forward until the rear side of slot 107ª in rim 107ᵇ acts against the tail $x$ of plate 107 and throws said plate 107 again into the position represented in Fig. XIII, when pin 105 will again engage with pin 79. Then of course the expansion of the spring must cease; but as its tendency to rotate the disks in opposite directions still continues the pressure on the tail $x$ will be kept up, and consequently the pin 105 will remain in contact with pin 79. The bobbin having now been wound and thrown out another bobbin falls into place and the cheeks 14 of course fall to their lower position, releasing the pressure of the collar 90 on the latch 80, whereupon the spring 200, coiled on the shaft 128 and engaging the latch 80, causes the latter to assume its former position, and the shoulder 81 engages the lug 82 as it comes around and holds the disk 73 stationary; but the strap 75 will continue to revolve the shaft 37 and the disk 72 for a portion of the way around, the friction of such strap being sufficient to overcome the inertia of the spring, and as the disk 72 continues to move while the one 73 is locked it will be seen that the pivot-pin 103ª will carry the plate 107 along with it, and thus cause the tail $x$ to come in contact with the forward edge of the notch 107ᵇ, rocking the plate upon its pivot and causing the pin 105 to disengage the pin 79, whereupon the shaft 37 will come to a standstill, while the gear 70 will continue in motion with the winding mechanism. By having the collar 90 adjustable on the rod 91 such collar may be set at different locations, so that the bobbin may be wound or filled to any desired extent.

From the foregoing it will be seen that we have combined in one machine the two devices well known in the art—namely, a bobbin-winding and a bobbin-ejecting mechanism—with the aforesaid latch in such a manner that the winding mechanism may be continuously operated, and will automatically cause the ejecting mechanism to become active at such time only when the bobbin shall have received the desired supply. It will also be understood that the terms "winding mechanism" and "ejecting mechanism" comprise, respectively, those elements which have the functions implied by the respective terms—that is to say, the winding mechanism comprises the cheek-pieces 14, which form pivotal guides receiving the arbors 12 of the bobbins and permitting the bobbins and their said arbors to rise as the bobbin fills, and in addition the continuously-driven winding-roller 6 for rotating the bobbin, while the ejecting mechanism consists of the ejecting-heads 38 and of course their carrying-arms 33 and the crank-shaft 37, carrying the crank 36, connected to said arms—and in fact the hereinbefore-described clutch, having its locking-lug 82, and the friction-gear on the end of said shaft 37, also form important parts of the ejecting mechanism; but the basket, while it is an important auxiliary to the ejecting mechanism, does not form an element of the same, for it is very obvious that were such basket omitted entirely the ejecting-heads would eject the bobbin, as usual, the only difference being that the bobbin would be ejected upon the floor directly at the foot of the machine, instead of being delivered at a distance; but in the use of these terms—i. e., "winding mechanism" and "ejecting mechanism"—we do not wish to be understood as limiting ourselves to the precise details specifically described herein, for it is very obvious that such details may be varied at will without departing from the spirit of our invention, which consists, mainly, in the combination which enables the continuous operation of the winding mechanism and automatically imparts the intermittent movement to the ejecting mechanism, substantially as we have described it.

We claim as our invention—

1. A continuously-operating winding mechanism, in combination with a bobbin-ejecting mechanism and a latch for holding the ejecting mechanism normally inactive, said winding mechanism having the pivoted cheek-pieces connected with said latch and provided with tracks for carrying the bobbins, said cheek-pieces being adapted to be elevated by the bobbin as it fills for unlocking said latch, substantially as set forth.

2. The combination, with the roller 6, of the pivoted cheek-pieces having angular slots therein for carrying a supply of bobbins and supporting a bobbin upon the roller 6, and stops for holding said bobbins while being wound, as set forth.

3. The combination, with the roller 6 and the frame, of pivoted cheek-pieces having a track adapted to swing toward said roller for supporting a bobbin thereon, spring-stops for retaining said bobbin at a certain position on said track, spring-stops 20, for holding a supply of bobbins in check, pivoted arms, hooks secured to said arms for forcing said bobbins from behind said spring-stops 20, and a shaft having a crank connected to said arms, as set forth.

4. The combination, with the frame and the roller 6, of pivoted cheek-pieces having a track adapted to swing toward said roller for supporting a bobbin thereon, the springs 21, for retaining said bobbin in place, the springs 20, for retaining a supply of bobbins at a distance from the springs 21, pivoted arms, the pivoted heads 38 on said arms for forcing the bobbin past springs 21, hooks pivoted to said arms and adapted to force a bobbin past the springs 20, and the shaft 37, having a crank connected to said arms, substantially as and for the purposes set forth.

5. The combination, with the pivoted cheek-pieces having a track for supporting the bobbin and suitable means for revolving the bobbin, of a tilting basket for receiving the bobbin when wound, stops for retaining said bobbin in place on said track while being wound, heads 38, for forcing said bobbin past said stops, pivoted arms, to which said heads 38 are pivoted, a link connecting said basket and one of said arms together, and a crank-shaft for oscillating said pivoted arms, substantially as set forth.

6. The combination, with the pivoted cheek-pieces having a track for supporting the bobbin and a roller for revolving the bobbin, of a tilting basket for receiving the bobbin when wound, stops for retaining the bobbin on said track while being wound, pivoted arms, heads pivoted to said arms for forcing said bobbin past said stops, a link connected to one of said arms and to said basket by slot-and-pin connection, the shaft 37, and a crank on said shaft connected to one of said arms, substantially as set forth.

7. The combination, with the driving-shaft, the pivoted cheek-pieces having a track for supporting the bobbin and a roller 6 on the driving-shaft for revolving the bobbin, of a basket for catching the bobbin, stops for retaining the bobbin on said track while being wound, the arms 33, connected with said basket, the heads 38 on said arms, the rock-shaft 128, upon which said basket is supported, the shaft 37, a crank on said shaft 37, connected with one of said arms 33, a friction-gear having a normal tendency to revolve shaft 37, a clutch on shaft 37, provided with the lug 82 and having its driving member constituting a part of said friction-gear and being driven by said driving-shaft, a spring for holding said clutch members normally in engagement, a latch 80 on shaft 128, adapted to engage said lug for compressing said spring, disengaging said members, and locking the shaft 37 against rotation, a spring for forcing said latch 80 toward said lug, and a rod connected to one of said pivoted cheek-pieces and to said latch 80, whereby the shoulder and lug will be disengaged by the movement of said cheek-pieces, as set forth.

8. The combination, with the pivoted cheek-pieces having a track for supporting the bobbin and the arm 92, a roller 6, for revolving the bobbin, and the bobbin-ejecting heads, of stops for retaining the bobbin in place while being wound, a basket for catching the bobbin, a rock-shaft 128, arms 31 on said shaft, upon which the basket is mounted, a revoluble shaft 37, a friction-gear for driving said shaft 37, a clutch on shaft 37, provided with the lug 82 and having its driving member constituting a part of the friction-gear, a spring for holding the members of said clutch normally in engagement, a latch adapted to engage said lug for the purpose described, the rod 91, connected to said arm 92, a collar on said rod adapted to abut against and operate said latch, a crank on shaft 37, the arms 33, carrying the ejecting-heads, the links 35 43, connecting said crank and arms 33 and arms 31 and 33, respectively, and a driving-shaft carrying said roller 6 and geared with the driving member of said clutch, substantially as set forth.

9. The combination, with the cheek-pieces having a track for supporting the bobbin, of a roller 6, for revolving said bobbin, the rock-shaft 128, arms 31 on said shaft 128, the shaft 37, a crank on shaft 37, connected with arms 31 for rocking the shaft 128, the arm 26, a tucker pivoted to said arm 26, an arm 127 on the shaft 128, and a link 28, connecting said arm 127 to said tucker for operating the latter, substantially as set forth.

10. The combination, with the frame and the roller 6, journaled therein, of the cheeks 14, pivoted to said frame and having the slots 13 therein for supporting a bobbin upon said roller, stops for retaining said bobbin in place while being wound, the shaft 37, a friction-gear for driving said shaft 37, a clutch on shaft 37, having one member connected with the shaft 37 and provided with a lug 82 and movable pin 105, and the other constituting a part of said friction-gear and having the pin 79, a spring for holding said pins normally in engagement, the shaft 128, a basket for catching the bobbin supported on shaft 128, the latch 80 on the shaft 128, having a shoulder for engaging said lug 82 and compressing said spring and disengaging said pins, and said latch having connection with one of said cheeks 14, whereby the rising of the latter will displace said latch and allow the spring to throw the pins together, the pivoted arms 33, pivoted heads on said arms 33, for forcing the bobbin past said stops, and crank on shaft 37, connected to one of said arms 33 and with said basket, substantially as set forth.

11. The combination, with the frame and the roller 6, journaled therein, of the cheek-pieces 14, pivoted to said frame above said roller and having the angular slots 13 therein, with one end of each projecting upward, the stops 21, for retaining a bobbin on the roller 6, the stops 20, for retaining a supply of bobbins in the upwardly-projecting ends of said slots, the pivoted arms 33, the heads 38, pivoted to said arms for forcing the bobbin past stops 21, hooks pivoted to said arms and adapted to pull a bobbin past the stops 20, and a shaft having a crank connected to said arms 33, substantially as set forth.

12. The combination, with a bobbin winding and ejecting mechanism, of a tilting basket for catching the ejected bobbin and a knife on the said basket for severing the web as the bobbin falls, substantially as set forth.

13. The combination, with a bobbin winding and ejecting mechanism, of a tilting basket for catching the ejected bobbin, a rock-shaft to which said basket is secured, an arm on said rock-shaft, a tucker for engaging the web for starting a new bobbin, a link connecting said arm with said tucker, and a serrated knife on said basket adapted to come in contact with the web, substantially as set forth.

14. The combination, with a bobbin winding and ejecting mechanism, of a rock-shaft, a basket mounted upon said shaft and adapted to receive the ejected bobbin, a tucker adapted to engage the web, an arm on said shaft connected with said tucker for operating the latter when said shaft is rocked, and a knife on said basket adapted to sever the web when the basket is tilted by said rock-shaft, as set forth.

15. The combination, with the bobbin-winding mechanism having the pivoted cheek-pieces adapted to be raised by the filling of the bobbin and a driving-shaft for continually operating said winding mechanism, of the shaft 37, a crank on shaft 37, the pivoted ejecting-heads, arms supporting said heads, connected with and operated by said crank, a friction-gear for driving shaft 37, having the loose gear 70 driven by said driving-shaft, two disks connected together by the pivoted plate 107, having the pin 105, one of said disks being loose and the other rigid on said shaft 37, and the loose one having the lug 82, the pin 79, projecting from gear 70, a spring for holding said pins in engagement, and a latch for engaging said lug, connected with and adapted to be disengaged by the movement of said cheek-pieces, substantially as set forth.

16. The combination, with the bobbin-winding mechanism having the pivoted cheek-pieces for supporting the bobbin, of the shaft 37, the pivoted ejecting-heads connected with and operated by said shaft 37, a friction-strap having a normal tendency to revolve said shaft 37, the wheel 70, having pin 79, mounted loosely on shaft 37, the disks 72 73, rigid and loose, respectively, on said shaft 37, the plate 107, pivoted to the disk 72 and having the pin 105, said disk 73 having a notch in which the end of said plate engages, lugs on the disks 72 73, a spring compressed between said lugs, a latch, said disk 73 having a second lug adapted to be engaged by said latch, a rod connecting said latch with one of said cheek-pieces, and an adjustable collar on said rod adapted to come against and disengage said latch, substantially as set forth.

17. The combination of the roller 6 for revolving the bobbin 11, pivoted tucker 25, and means for operating the tucker, consisting of arm 127, link 28, and means for moving the arm, substantially as and for the purpose set forth.

18. The combination of the roller 6 for revolving the bobbin 11, pivoted tucker 25, and means for operating the tucker, consisting of an arm 127, link 28, rock-shaft 128, and means for rocking the shaft, substantially as and for the purpose set forth.

19. The combination of the roller 6 for revolving the bobbin 11, basket 30, rock-shaft upon which the basket is mounted, arms 31, to which the basket is secured, and means for moving the arms, substantially as and for the purpose set forth.

20. The combination of the roller 6 for revolving the bobbin 11, a pivoted tilting basket for receiving and removing the full bobbins, and means for operating the basket, consisting of arms 33, link 43, a shaft 37, and crank-and-link connection between the shaft and the arms 33, substantially as and for the purpose set forth.

21. The combination of the roller 6, slotted side pieces 14, for supporting the bobbins, spring-arms 20, holding the bobbins in the slots of said pieces 14, and a device for removing the bobbins from behind the spring-arms, consisting of hooks 45, having supporting-lugs $46\frac{1}{2}$, arms 33, shaft 37, crank 36 on said shaft, and link 35, connecting said crank and arms 33, and means for revolving the shaft 37, substantially as and for the purposes set forth.

22. The combination, with the pivoted cheek-pieces having a track for supporting the bobbin, of a roller for revolving said bobbin, the rock-shaft 128, arms 31 on shaft 128, the shaft 37, a crank on shaft 37, connected with arms 31 for rocking the shaft 128, the arm 26, a tucker pivoted to said arm 26, an arm on shaft 128, connected to said tucker for operating the latter, and means for revolving the shaft 37, substantially as set forth.

23. The combination, with the driving-shaft, pivoted cheek-pieces, and the ejecting-heads, of the shaft 37, having a crank, arms carrying said heads and having connection with said crank, a loose gear-wheel on shaft 37, driven from said driving-shaft, a friction-strap connected to said gear-wheel for revolving shaft 37, the disk 72, secured to shaft 37, the disk 73, loose on shaft 37 and having a notch, a plate pivoted to disk 72 and having a tail engaging in said notch, a pin on each of said disks, a spring-bearing between said pins, the lug 79 on said gear-wheel, a lug 105, projecting from said plate, a lug 82 on the disk 73, and a latch for engaging lug 82, connected to one of said cheek-pieces, substantially as set forth.

JOHN FRANKLIN McAFEE.
JOHN HENRY LOBACK.

In presence of—
H. HUTCHINSON,
U. A. McBRIDE.